Nov. 21, 1933.  E. W. JOHNSON  1,935,908
HARVESTER
Filed Dec. 12, 1931  2 Sheets-Sheet 1
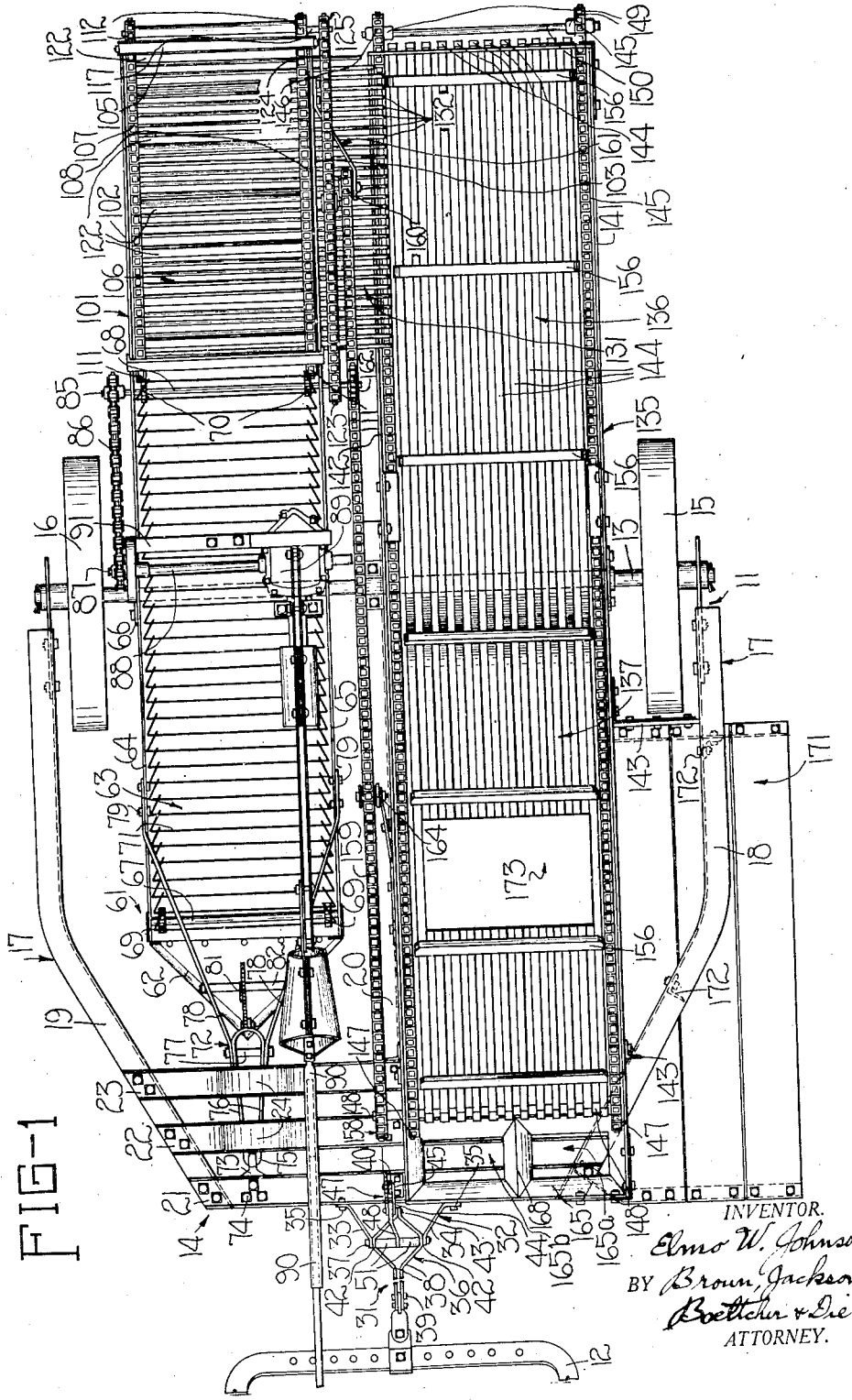
INVENTOR.
Elmo W. Johnson
BY Brown, Jackson
Boettcher & Diemer
ATTORNEY.

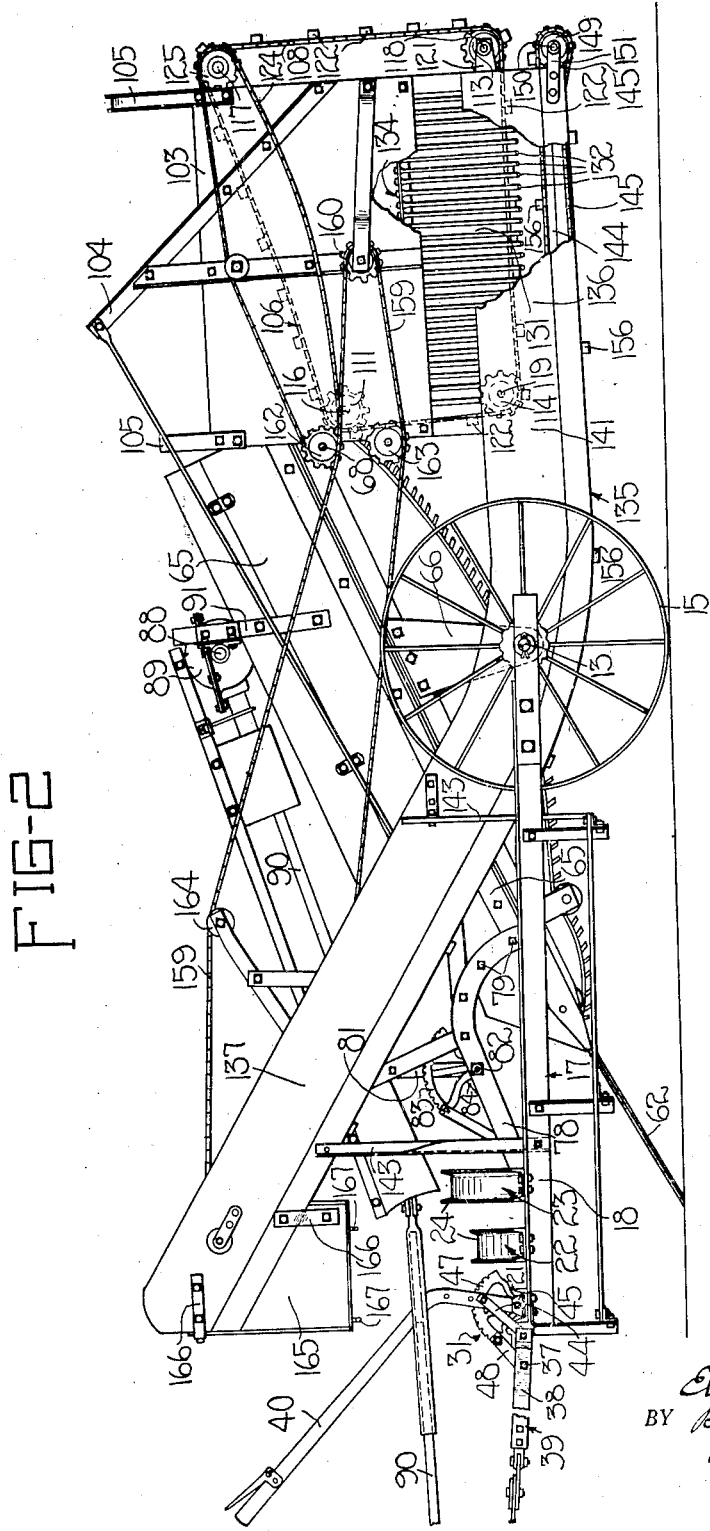

Patented Nov. 21, 1933

1,935,908

UNITED STATES PATENT OFFICE 1,935,908

HARVESTER

Elmo W. Johnson, Hicksville, N. Y., assignor to Syracuse Chilled Plow Company, Inc., Syracuse, N. Y., a corporation of New York Application December 12, 1931
Serial No. 580,518

7 Claims. (Cl. 55—51)

This invention relates to harvesters and more particularly concerns an improved implement for digging and gathering potatoes or the like.

The present invention is, broadly speaking, an improvement over the device of my Patent No. 1,872,744, Serial No. 408,299, filed November 19, 1929, for improvement in potato digging machine.

It is broadly old to mount a potato digger on a wheeled truck and associate therewith a conveying device or devices for transmitting the potatoes into a suitable hopper or receptacle which is located on the implement. It is also old to raise and lower the digging unit relative to the truck for rendering the former operative or inoperative with the ground.

But so far as I am aware, none of the prior constructions provides a harvester of the above general type mounted on a suitable transport truck, and adapted to be supported on and drawn by a suitable draft vehicle, with the harvester as a whole capable of being adjusted vertically relative to the draft vehicle and also having a digging unit independently adjustable relative to the first mentioned adjustment and said wheeled truck.

Therefore, it is an object of the present invention to provide a harvester of the type mentioned wherein the implement is mounted on a two wheeled truck with its forward end supported on the pulling vehicle and capable of vertical adjustment relative thereto for meeting different operating requirements, with a digging unit capable of independent vertical adjustments on the truck to lower the digging tool into the ground and to raise it therefrom.

Another object of the present invention is the provision in such an implement of an improved conveying mechanism and sorting elevator whereby the potatoes may be sorted and graded simultaneously with the harvesting operation.

A further object is to provide such an implement with an improved raising and lowering mechanism which is operable by a lever easily accessible from the operator's position on the pulling vehicle.

Other objects and advantages will be apparent to one skilled in the art after a consideration of the following detailed description of a preferred embodiment of the same, taken in conjunction with the accompanying drawings, in which:

Figure 1 is a plan view of an improved potato harvester embodying my invention; and Figure 2 is a side elevational view of the same.

Referring to the drawings, 11 indicates generally the harvester which is secured to a draw bar 12, or the like, of a tractor or other pulling vehicle. The harvester 11 has a transport unit or truck 14 which comprises a centrally disposed transverse axle 13 on the opposite ends of which are mounted supporting wheels 15 and 16. The main frame 17 of the harvester includes two forwardly and inwardly extending side members 18 and 19 and a central frame member 20, all of which have their rear ends secured to the axle 13 by suitable brackets or the like. The forward ends of these frame members 18, 19 and 20 are bolted to cross members, shown as channel irons 21, 22 and 23. The channel irons 22 and 23 are arched as at 24, between the members 19 and 20 for a purpose to be described later.

The main frame 17 is provided with a leveling mechanism 31 for vertically adjusting the frame as a unit relative to the tractor or pulling vehicle draw bar 12. This mechanism 31 preferably comprises a bracket structure 32 mounted on the frame 17 and a draft member 36 pivotally mounted in said bracket and connected to the draw bar 12. A hand lever 40 actuates the draft member 36 for bringing about this vertical adjustment of the frame 17. The bracket 32 is shown as consisting of straps 33 and 34 bolted to the cross member 21, as at 35, the forward ends of these straps receiving a cross bolt 37. The draft member 36 consists of two bars 38 which have their forward ends pivotally connected to the draw bar 12 of the pulling vehicle, as at 39, and intermediate portions 42 spread apart and journaled on the cross-bolt 37 connected with the frame. The draft member 36, therefore, comprises, in general, a draft link pivotally connected with the frame of the pulled vehicle or truck 14 and with the pulling vehicle, whereby said vehicles are pivotally connected. The rear ends of the bars 38 are bolted together at 43, and an upwardly extending link 44 is pivotally secured to the bolt 43 and connected with the hand lever 40.

The hand lever 40 is pivotally mounted on a bracket 45 fixed to the channel iron 21, and has the usual latch mechanism which engages a notched sector 47. The notched sector 47 is rigidly mounted on the channel member 21, and is further braced by a downwardly extending strap 48 which is held on the cross bolt 37 between a pair of sleeves 51. These sleeves 51 are received on the bolt 37 and so positioned that they space the draft bars 38 from the bracing strap 48. It will now be seen that draft is transmitted through the draft bars 38 and bracket 32 to the wheeled truck 14. The front end of the frame 17 is supported by the draw bar 12 and capable of being raised or lowered vertically by moving the hand lever 40 to rock the draft bars 38 on the bolt 37 by virtue of the connecting link 44.

The present harvester is shown as having a single row digging unit 61, but it is to be understood that two or more such units may be employed in this construction within the broad teachings of my invention. This digging unit 61 includes a conventional digging tool or plow 62 mounted on the forward and lower end of an inclined conveyor 63. The conveyor 63 has two longitudinally extending side walls 64 and 65 spaced apart by suitable means (not shown). A pair of depending brackets 66 are bolted on the outer sides of the walls 64 and 65 of the digger, and the axle 13 is journaled in the lower ends of these brackets 66 for rotatably supporting the digging unit thereon. A pair of shafts 67 and 68 are mounted in opposite ends of the side walls 64 and 65, and these shafts carry spaced sprockets 69 and 70 over which is trained an endless chain or belt 71.

The front end of the digging unit 61 is supported by a connection 72 which is positioned for vertical movement beneath the arched portions 24 of the channels 22 and 23, and secured to the frame member 21. This connection 72 consists of an attaching member or hook 73 bolted to the underside of the channel iron 21, as at 74. This hook 73 receives an eye member 75 to which are bolted two draft links 76. The rear ends of these draft links 76 are pivoted on a cross bolt 77 between two beams 78. The beams 78 extend rearwardly and downwardly and are rigidly bolted, at 79, to the opposite side walls 64—65 of the digger 61. An adjusting device similar to the mechanism 31 for raising and lowering the frame 17 is employed in connection with the draft links 76 and beams 78 for raising and lowering the digging tool 62 relative to the ground. This adjusting device comprises a hand lever 81 pivotally supported on a cross rod 82 extending between the beams 78. The hand lever 81 has a suitable latch mechanism (not shown) which engages a notched sector 83 rigidly supported on the cross rod 82. A link 84 connects the hand lever 81 to the rearmost ends of the draft links 76, and by moving this lever the draft links 76 will be rocked about their connection 73 on the main frame to raise or lower the digging unit 61 with respect to the ground.

When the digging tool 62 is lowered into the ground to its operative position by the lever 81, soil and potatoes will be directed onto the upwardly inclined conveyor 63 in the forward movement of the implement. The endless chain or belt 71 being composed of spaced rods will allow the loose soil to drop through while retaining the potatoes and conveying them upwardly.

The endless belt 71 is driven by the sprockets 70 on the shaft 68, and the latter extends through the righthand side member 64 of the conveyor and carries a fixed sprocket 85 thereon. The rear bight of a driving chain 86' is trained over the sprocket 85 and said chain is received on a driving sprocket 87, mounted on a jackshaft 88, the latter being driven by suitable gearing in the transmission housing 89 from the power take-off shaft 90. The jackshaft 88 and housing 89 are supported above the conveyor by a suitable bracket structure 91 supported on the side members 64 and 65. The power take-off shaft 90 extends forwardly and is driven from the tractor or other draft vehicle. The power take-off device, per se, forms no part of this invention and it is therefore understood that I may employ one of the supporting wheels 15—16 to furnish power for driving the conveyors on the implement if desired.

A vine separator 101 is disposed in the rear of the conveyor 63 for receiving potatoes from the latter in the continuous operation of the implement. This separator 101 has opposite side walls 102 and 103 connected by suitable braces 104 to the conveyor 63. The walls 102 and 103 are further braced by arched straps 105. An endless conveyor 106 is mounted between the side walls 102 and 103 and this conveyor comprises two endless chains 107 and 108 trained over four sets of sprocket wheels 111, 112, 113 and 114, as best seen in Figure 2. These sprockets are in turn mounted on suitable shafts 116, 117, 118 and 119, the shafts 116 and 119 being journaled in the side walls 102 and 103 while the shafts 117 and 118 are mounted in brackets or extensions 121 in the rear of the side walls 102 and 103. The chains 107 and 108 carry bars 122 which are spaced a determined distance apart on these chains (see Figure 2) for allowing the potatoes to drop between them while retaining the vines or weeds.

The vine separating conveyor 106 is driven by the elevator shaft 68 which carries a sprocket 123 near the inner extended end thereof. A driving chain 124 is trained over the sprocket 123 and the rear bight of this chain is received on a sprocket 125 for driving the vine separator shaft 117. The conveyor 106 is driven in a clockwise direction as viewed in Figure 2, and as the potatoes leave the conveyor 63 they fall through the conveyor 106 while the vines and weeds are carried on the bars 122 over the rear of the conveyor and dropped on the ground.

As the potatoes drop through the conveyor 106, they fall upon the downwardly inclined surface of a gravity conveyor 131, which extends downwardly and laterally beneath the upper run of the vine conveyor 106 and above the lower run thereof. This gravity conveyor 131 preferably consists of a plurality of rods 132 which are loosely secured to a longitudinally extending angle member 134 (Figure 2) pivotally or otherwise secured to the inside of the righthand wall 102 of the vine separator. The potatoes then slide or roll down these rods by gravity and are deposited into an elevating unit or sorting elevator 135 mounted laterally adjacent the digging unit 61.

The elevating unit or sorting elevator 135 has a horizontal portion 136 for receiving the potatoes and which leads forwardly into an inclined portion 137. The elevator 135 has opposite side walls 141 and 142 mounted on the axle 13. The forward or inclined end 137 of the conveyor is rigidly supported on the longitudinally extending frame members 18 and 20 as by vertically extending braces 143 or the like. A plurality of fixed bars or slats 144 (as best seen in Figure 1) extend the entire length of the elevator 135, and these slats are spaced apart to allow dirt and the like to fall between them. Mounted adjacent each of the side walls 141 and 142 are elevator chains 145 and 146 which are trained over sets of sprocket wheels. The upper bights of these chains are trained over a pair of sprockets 147 fixed on a shaft 148 journaled in the forward ends of the walls 141 and 142. The lower bights of these chains are trained over sprockets 149 which are carried on shaft 150.

The shaft 150 is journaled in brackets 151 secured to sides 141 and 142 of the conveyor. A plurality of spaced bars 156 have their opposite ends secured to the chains 145 and 146, and are drawn over the longitudinally extending bars 144 to move the potatoes forwardly along the slats or bars 144 and up the elevator 135.

The elevator chains 145 and 146 are driven by the shaft 148 at the upper end of the elevator. The shaft 148 extends through the side wall 142 and carries a third sprocket 158. A driving chain 159 is trained over this sprocket and also over an idler sprocket 160 mounted near the rear end of the elevator 135. The idler sprocket 160 merely supports the rear bight of the driving chain 159 and this sprocket is supported and spaced from the left wall 103 of the vine separator by a suitable bracket 161. A driving sprocket 162 mounted on the elevator shaft 68 drives the chain 159 to thereby transmit power to the elevator shaft 148. An idler sprocket 163 is mounted below the driving sprocket 162, and this sprocket 163 engages the lower run of the driving chain 159. An idler 164 engages the upper run of the chain 159 and aids in holding it in driving engagement with the sprocket 162.

When the potatoes reach the end of the elevator they drop into a hopper or receptacle 165 which is mounted at the forward end of the elevator, as by brackets 166 or the like. Hooks 167 are provided around the lower edge of the hopper for attaching sacks or other suitable containers used in handling the harvested crop. The hopper 165 is divided by a partition 168 into two parts 165a and 165b for grading the potatoes, separate sacks or containers being secured below each of the hoppers 165a and 165b.

Mounted on the righthand side of the frame 17 is a platform 171 which is suspended from the frame member 18 by vertical angle irons 172. A sheet metal grading plate 173 is preferably fixed on the longitudinal slats 144 midway of the inclined portion 137 and the cross bars 156 of the chains 145, 146 move the potatoes over this plate. In the harvesting operation, an attendant occupies a position on the platform 171 opposite the plate 173 and grades or sorts the potatoes as they pass over the plate 173 by pushing the better ones to one side and the less choice potatoes on the other side so that one grade will fall into one hopper 165a and the other grade into the hopper 165b.

Before transporting the harvesting implement from one location to another, the digging tool 62 is raised by the lever 81 to its maximum position which is above the horizontal plane of the ground on which the wheels 15 and 16 stand. But should the ground be uneven or hilly, the maximum raised position of the digging tool or plow might not be sufficiently high enough to clear the ground in all instances and, therefore, the frame 17 including the digging unit 61 can be raised an additional amount by moving the lever 40 rearwardly. Also should it be desired to lower the digging tool or plow 62 below that position afforded by the lever 81, the frame 17 including the digging tool 62 can be lowered an additional amount by the lever 40. Thus, the vertical adjustment of the digging unit brought about by the lever 81 can be supplemented by the vertical adjustment of the frame 17 accomplished through the lever 40.

The digging unit 61 is vertically adjustable independently of the frame 17. The vine separator unit 106 is constantly associated with the elevating unit 135 by virtue of the arrangement of the inclined rods 132 of the gravity conveyor 131. The rods 132 are loosely supported at their upper ends in the angle member 134 while their lower ends extend over and are supported on the inner wall 142 of the elevator 135. When the digging unit 61 is adjusted vertically with respect to the ground, the inclined rods 132 move relative to the side wall 142 and these rods are of sufficient length that their lower ends will always be supported on this wall.

In the operation of the implement as a whole, the potatoes and loose soil with vines, etc. dug up by the digging tool will be received on the upwardly moving conveyor belt or chain 71 at which time most of the loose soil will be eliminated by dropping through the conveyor. Means may be provided for agitating the conveyor 71, if desired. The potatoes and remaining material will be conveyed onto the vine separator 101 which receives the vines, weeds or other like material, allowing the potatoes to drop between the bars 122 onto the inclined rods 132, while the vines and weeds will be carried on the bars 122 and dropped on the ground in the rear of the implement due to the rearward movement of the endless vine conveyor 106.

The potatoes falling upon the inclined rods 132 will roll downwardly and be deposited into the elevating unit 135. In rolling and sliding down the rods 132 much of the remaining dirt will be loosened from the potatoes and drop between the rods. The elevating unit 135 will continue this cleaning action by rolling and sliding the potatoes forwardly and upwardly by virtue of the elevating chains 145—146 and bars 156 until they pass over the metal plate 173. An attendant standing on the platform 171 grades the potatoes as they pass over the metal plate by pushing the better ones to one side and the less choice to the other side as pointed out above, so that the two grades will fall into the individual hoppers where separate sacks or containers are hung on the hooks 167 to receive them.

While I have shown a preferred embodiment of my invention, certain changes and adaptations may be made and still be within the spirit of my invention as set forth in the following claims:—

What I claim is:—

1. The combination with a harvesting implement adapted to be drawn by a pulling vehicle, of a two-wheeled truck for transporting said implement, a digging unit mounted on said truck for operatively engaging the ground, a sorting elevator mounted laterally adjacent said digging unit for receiving the crop in the harvesting operation, means for supporting said truck on the rear of said vehicle, and means for raising and lowering one end of said truck with respect to said supporting means.

2. The combination in a harvesting implement adapted to be drawn behind a pulling vehicle, of a frame, a pair of supporting wheels for one end of said frame, a draft link pivotally connected between the opposite end of said frame and the pulling vehicle for transmitting draft to said implement, means associated with said draft link for raising and lowering said frame relative to said vehicle, a digging unit mounted on said frame for independent vertical movement relative thereto, link means for connecting said digging unit to said frame, means associated with said link means for raising and lowering the digging unit relative to said frame, a sorting elevator mounted adjacent said digging unit for receiving the crop therefrom and adapted to convey it to a receptacle, and means associated with said elevator to facilitate sorting the crop.

3. The combination in a harvesting implement adapted to be drawn behind a pulling vehicle, of a frame, a pair of supporting wheels therefor, a draft link pivotally connected to said frame and to the vehicle for supporting said frame and thereby transmitting draft to said implement, a lever associated with said draft link for raising and lowering said frame relative to said pulling vehicle, a digging unit mounted on said frame and capable of independent vertical movement relative to said frame, a link for connecting said digging unit to said frame, a lever associated with said link means for raising and lowering the digging unit relative to said frame, and a sorting elevator mounted adjacent said digging unit for receiving the crop therefrom and adapted to convey it to a receptacle.

4. The combination with a harvesting implement adapted to be drawn by a pulling vehicle, of a wheeled truck for transporting said implement, a digging unit mounted upon said truck adapted to remove potatoes from the ground and to convey the same rearwardly, and a sorting elevator mounted laterally adjacent said digging unit and adapted to receive potatoes therefrom and to convey the same forwardly, said sorting elevator comprising a pair of hoppers disposed at the forward end of said elevator to receive the potatoes discharged therefrom, an operator's platform on the elevator, a grading plate on the elevator over which the potatoes are conveyed and arranged adjacent the operator's platform whereby as the potatoes pass thereover the operator may sort them so that they will be discharged into one or the other of said hoppers.

5. A harvesting implement of the class described comprising, a frame, means at the forward end of the frame for pivotally connecting the same to a tractor, a two wheeled truck to which the rear end of said frame is attached, a digging unit supported on said frame and capable of adjustment vertically with respect thereto, a conveyor pivotally secured to said frame and fixed to said digging unit to be movable therewith vertically of said frame, said conveyor extending rearwardly of said frame, a vine conveyor disposed rearwardly of said frame and into which potatoes, dirt and vines are discharged from said first conveyor, a gravity conveyor comprising a plurality of parallel rods disposed transversely of the implement and beneath said vine conveyor to receive the potatoes separated from the vines, a sorting conveyor into which said gravity conveyor discharges said potatoes, said sorting conveyor being rigidly fixed on said frame and extending upwardly and forwardly from said gravity conveyor over said frame, and hopper means into which said sorting conveyor discharges said potatoes.

6. A harvesting implement of the class described comprising, a frame, means at the forward end of said frame adapted to connect the same to a tractor, said means permitting adjustment of the forward end of said frame vertically with respect to said tractor, a pair of wheels to which the rear end of said frame is connected, a conveyor rigidly fixed above said frame and projecting downwardly and rearwardly therefrom, a digging unit mounted on said frame for vertical adjustment with respect thereto, a conveyor fixed to said digging unit and extending upwardly therefrom and rearwardly of said frame, a gravity conveyor extending laterally of said implement at the rear ends of said conveyors, a vine conveyor over said gravity conveyor and into which said digging unit conveyor discharges, and means for operating said conveyors by power derived from the tractor to which the implement is attached whereby potatoes dug by said unit are separated from the vines by said vine conveyor and separated from the dirt dug up with them by said digging unit and gravity conveyors prior to the discharge of the potatoes into the first of said conveyors.

7. In combination in a harvesting implement adapted to be drawn by a pulling vehicle, a wheeled axle member for said implement, a digging unit rockably mounted upon said axle member and adapted to dig and convey the crop rearwardy of the implement, a sorting conveyor unit also rockably mounted upon said axle member laterally adjacent the digging unit and comprising an elevator adapted to receive the harvested crop from said digging unit and to convey the same forwardly of the implement during the harvesting operation, a pair of hoppers disposed at the forward end of the elevator and adapted to receive the crop discharged therefrom, an operator's platform on said elevator, and a grading plate on the elevator over which the crop is conveyed by the elevator, said plate being arranged adjacent the operator's platform whereby the crop may be sorted by the operator so as to be discharged by said elevator into one or the other of said hoppers, means for supporting the forward ends of said units on the rear of said pulling vehicle, and cooperative means joining said units with said supporting means and adapted for raising and lowering the forward ends of the units with respect to said supporting means.

ELMO W. JOHNSON.